(12) United States Patent
Sullivan et al.

(10) Patent No.: US 9,949,554 B2
(45) Date of Patent: Apr. 24, 2018

(54) BARBER CLIPPER STAND

(71) Applicants: Christopher Dean Sullivan, Pittsburgh, PA (US); Richard Earl Harris, Pittsburgh, PA (US)

(72) Inventors: Christopher Dean Sullivan, Pittsburgh, PA (US); Richard Earl Harris, Pittsburgh, PA (US)

( * ) Notice: Subject to any disclaimer, the term of this patent is extended or adjusted under 35 U.S.C. 154(b) by 0 days.

(21) Appl. No.: 15/489,230

(22) Filed: Apr. 17, 2017

(65) Prior Publication Data

US 2017/0215556 A1 Aug. 3, 2017

Related U.S. Application Data

(63) Continuation-in-part of application No. 14/859,380, filed on Sep. 21, 2015.

(Continued)

(51) Int. Cl.
*A47F 7/00* (2006.01)
*A47B 43/00* (2006.01)
(Continued)

(52) U.S. Cl.
CPC ............... *A45D 44/06* (2013.01); *A47F 5/04* (2013.01); *A47F 5/08* (2013.01); *A47L 7/0066* (2013.01);
(Continued)

(58) Field of Classification Search
CPC ...... A45D 44/06; A45D 44/00; A45D 44/004; A45D 4/18; H05K 5/0247; F16M 11/04; A47F 5/04; A47F 5/05; A47F 5/106; A47F 5/02; A47F 5/0876; A47F 7/005; A47F 2007/0085; A47F 2007/0092; A47F 5/08; A47B 46/005; A47G 25/0664; D06F 57/04; D06F 57/02
USPC ..... 211/26.2, 196, 26, 205, 197, 107, 133.4, 211/163, 166, 144, 39, 60.1, 61, 68, 85.2, 211/13.1, 67, 10, 87.01; D28/38, 73; 248/121, 415, 218.4
See application file for complete search history.

(56) References Cited

U.S. PATENT DOCUMENTS 739,275 A * 9/1903 Abbe ........................ A01G 9/02
 211/115
900,014 A * 9/1908 Hennerman ............. A01G 9/02
 211/120

(Continued)

FOREIGN PATENT DOCUMENTS

CA 2445556 A1 4/2005

*Primary Examiner* — Jennifer E. Novosad
(74) *Attorney, Agent, or Firm* — David G. Oberdick

(57) ABSTRACT

An apparatus for holding and separating the electrical power cords of multiple barber clippers and other barber accessories. The apparatus includes a central pole, at least one hanger attachment holder attached to the central pole and at least one cord separator attached to the central pole. The hanger attachment holder has at least two hangers attached to the underside or perimeter of the hanger shelf for holding barber clippers and other barber accessories. The cord separator is located under the hanger attachment holder, and has at least two recessed areas along the perimeter of the shelf, with each recessed area aligned with the position of a corresponding hanger on the hanger shelf and acting to gather the electrical power cord of a barber clipper or other barber accessory held by the hanger.

19 Claims, 11 Drawing Sheets

Related U.S. Application Data

(60) Provisional application No. 62/054,104, filed on Sep. 23, 2014.

(51) Int. Cl.

| | | |
|---|---|---|
| *A47B 47/00* | (2006.01) | |
| *A47B 57/00* | (2006.01) | |
| *A47F 5/08* | (2006.01) | |
| *A45D 44/06* | (2006.01) | |
| *A47L 7/00* | (2006.01) | |
| *F16M 11/04* | (2006.01) | |
| *A47F 5/04* | (2006.01) | |

(52) U.S. Cl.
CPC ...... *F16M 11/04* (2013.01); *A47F 2007/0085* (2013.01)

(56) References Cited

U.S. PATENT DOCUMENTS

| | | | |
|---|---|---|---|
| D978,670 | | 12/1910 | Solomon |
| 978,670 A * | | 12/1910 | Solomon ............... A47F 5/02 |
| | | | 211/163 |
| 1,065,381 A * | | 6/1913 | Martin ................... A47K 1/09 |
| | | | 211/166 |
| 1,409,609 A * | | 3/1922 | Stockle ............... A47C 29/006 |
| | | | 135/147 |
| 2,639,820 A * | | 5/1953 | Lee ....................... A45D 44/02 |
| | | | 211/163 |
| 2,665,517 A * | | 1/1954 | Archer ................... A01K 97/06 |
| | | | 211/144 |
| 3,613,901 A * | | 10/1971 | Montelius ............... A47F 5/05 |
| | | | 211/166 |
| 3,826,378 A * | | 7/1974 | Novak ................. A47B 49/004 |
| | | | 211/166 |
| 4,534,471 A * | | 8/1985 | Zahn ..................... B41K 1/58 |
| | | | 211/163 |
| 4,688,685 A * | | 8/1987 | Brace ..................... A47F 5/04 |
| | | | 211/60.1 |
| 4,871,074 A | | 10/1989 | Bryson et al. |
| 4,877,140 A * | | 10/1989 | Lee ....................... A47F 5/02 |
| | | | 211/163 |
| 4,971,204 A * | | 11/1990 | Alsobrook ............. A47F 5/02 |
| | | | 211/205 |
| 4,979,085 A * | | 12/1990 | Voorhees ............... F21V 1/00 |
| | | | 211/196 |
| 5,064,154 A | | 11/1991 | Payne |
| 5,379,903 A * | | 1/1995 | Smith ................... A45D 44/02 |
| | | | 132/289 |
| 5,535,895 A * | | 7/1996 | Valiulis ................. A47F 5/02 |
| | | | 211/163 |
| 5,676,261 A * | | 10/1997 | Baughman ........... A47B 49/004 |
| | | | 211/163 |
| 5,772,050 A * | | 6/1998 | Shih ..................... B41K 1/58 |
| | | | 211/163 |
| 5,839,586 A * | | 11/1998 | Smith ................... A47F 5/04 |
| | | | 211/163 |
| 5,924,579 A | | 7/1999 | DuPont et al. |
| D435,185 S | | 12/2000 | Winchester |
| 6,273,277 B1 * | | 8/2001 | Geldenhuys ........... B25H 3/025 |
| | | | 211/115 |
| 6,581,890 B2 * | | 6/2003 | Johnson ................. A45D 44/04 |
| | | | 248/161 |
| 6,769,554 B1 | | 8/2004 | Udofiah |
| 6,969,031 B2 * | | 11/2005 | Ugent ................. A61M 5/1415 |
| | | | 248/125.8 |
| 6,971,613 B2 * | | 12/2005 | Shendelman ............. A47F 5/04 |
| | | | 211/196 |
| 7,296,775 B2 * | | 11/2007 | Mayer ................. H01R 25/006 |
| | | | 211/163 |
| 7,534,136 B2 | | 5/2009 | Bova |
| 7,617,936 B2 | | 11/2009 | Barnett, Jr. |
| 7,641,156 B2 * | | 1/2010 | Medders ............... A47B 81/04 |
| | | | 211/203 |
| 8,342,341 B2 * | | 1/2013 | Cass ....................... A47J 47/16 |
| | | | 211/70 |
| 2003/0192840 A1 * | | 10/2003 | Hoyle ....................... A47F 5/05 |
| | | | 211/85.2 |
| 2006/0065613 A1 * | | 3/2006 | McKay ..................... A47F 5/02 |
| | | | 211/85.2 |
| 2006/0141855 A1 * | | 6/2006 | Bloom ................. H01R 13/447 |
| | | | 439/501 |
| 2009/0008347 A1 * | | 1/2009 | Bell ....................... A45D 44/02 |
| | | | 211/61 |
| 2009/0218252 A1 * | | 9/2009 | Michel ................... A45D 24/22 |
| | | | 206/581 |
| 2013/0313213 A1 * | | 11/2013 | Ellison ..................... A47F 5/04 |
| | | | 211/144 |
| 2016/0081458 A1 * | | 3/2016 | Sullivan ................. A45D 44/06 |
| | | | 361/679.01 |

* cited by examiner

US 9,949,554 B2

BARBER CLIPPER STAND

CROSS-REFERENCE TO RELATED APPLICATION

This application is a Continuation In Part Application of U.S. patent application Ser. No. 14/859,380, filed on Sep. 21, 2015, which claims the benefit of U.S. Provisional Application Ser. No. 62/054,104, filed Sep. 23, 2014, all are herein incorporated by reference.

FIELD OF THE INVENTION

The present invention is related generally to a barber clipper stand for use in holding two or more barber clippers and separating the electrical wires for each.

BACKGROUND OF THE INVENTION

The present invention addresses a current problem in many barber shops. Specifically, barbers use multiple clippers to service customers, and the clippers are often plugged into multiple outlets or a single power jack such that the cords for the clippers lay over each other on the floor. This arrangement presents safety and tripping hazards within a barber shop. It also reduces the tangling of power cords general and promotes the efficiency of barber shop operations through general cord management.

The present invention provides a barber clipper stand that holds two or more barber clippers and helps separate the power cords for each. As such, the safety and tripping hazards associated with many current operations are obviated.

BRIEF DESCRIPTION OF THE DRAWINGS

The present invention is illustratively shown and described in reference to the accompanying drawings, in which.

DETAILED DESCRIPTION OF THE INVENTION

Figure 1:
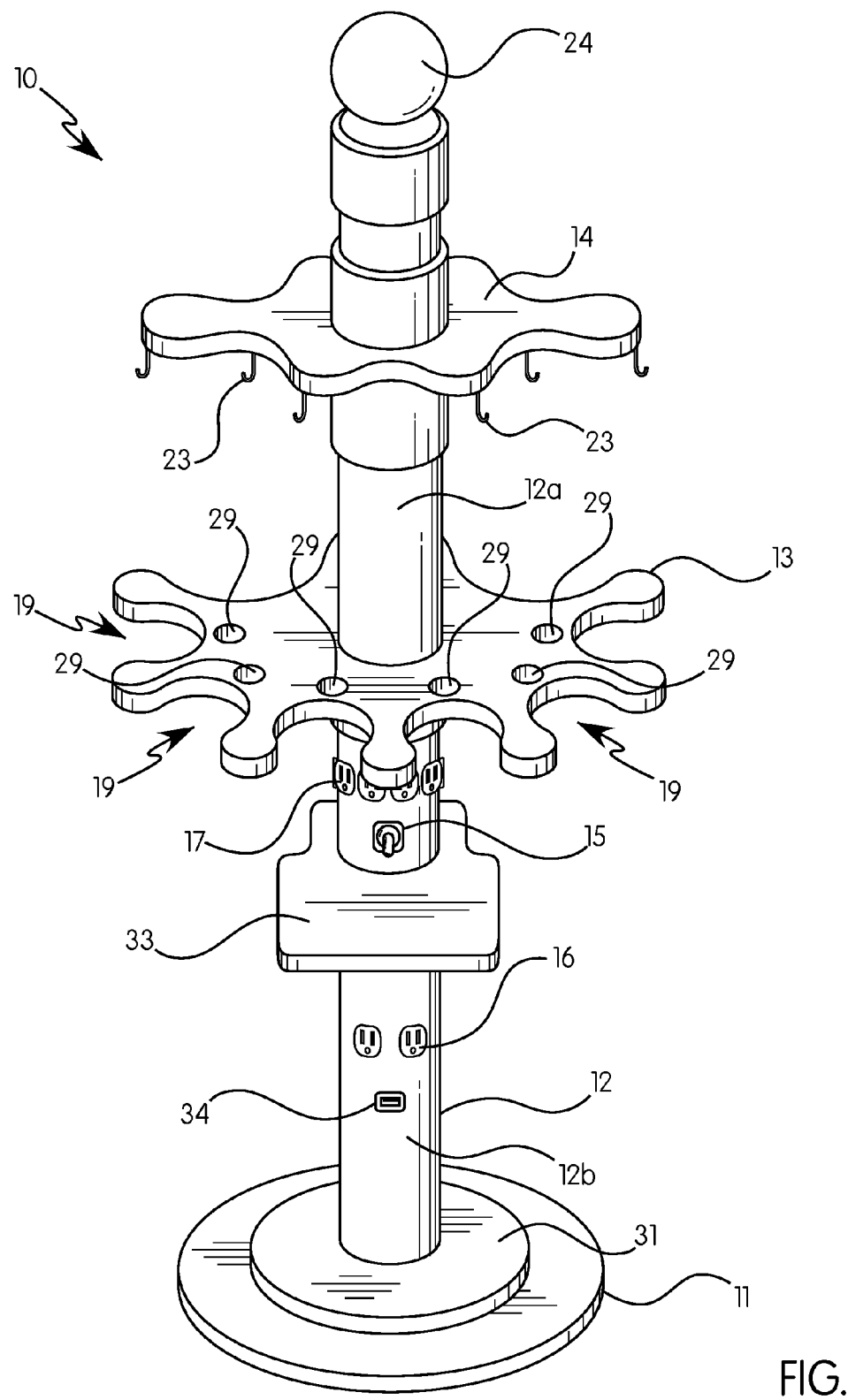
FIG. 1 is an isometric view of one embodiment of the barber clipper stand of the present invention.

Referring to FIGS. 1-5, the barber clipper stand 10 of the present invention, in one embodiment, includes a base 11, a central pole 12, a cord separator 13, a hanger attachment holder 14, and at least one electrical outlet 17 located proximate to cord separator 13. In one embodiment, electrical outlets 17 are circumferentially located around central pole 12 and under cord separator 13. Barber clipper stand 10 can also include, in alternative embodiments, at least one shelf 33 and at least one electrical outlet 16 located at the lower portion of pole 12 and proximate to and/or under shelf 33. Barber clipper holder 10, in turn, can be connected to an electrical outlet by electrical cord 18. Other power supplies may be used with barber clipper stand 10, such as a battery. In an alternative embodiment of the invention, a raised shelf 31 sits above base 11 to form recess 32. Recess 32 can be used to store cord 18 when not in use (cord 18 can be wrapped around pole 12 and inside recess 32. Shelf 31 can have varying perimeter shapes.

In a preferred embodiment, electrical cord 18 provides power to all electrical outlets and devices associated with barber clipper stand 10, including electrical outlets 16 and 17, as well as light 24, which is mounted to the top of pole 12. Additional electrical outlets can also be added to pole 12 of barber clipper stand 10, such as outlets located proximate to hanger attachment holder. In an alternative embodiment, at least one USB port 34 can be added to pole 12 as well. This port is preferably located below shelf 33 so that the barber or customer can charge a cellular or smart phone, or similar electronic device such as a tablet, while the device is resting on top of shelf 33. Charging can occur while the barber is servicing the customer. Ports 34 can also be placed at other locations along pole 12. In a further embodiment, pole 12 can also include at least one electrical switch 15 that activates the power to all or a portion of the outlets, ports and lights associated with barber clipper stand 10. Preferably, this electrical or power switch 15 is located below cord separator 13, but one or more other locations are possible.

Figure 13:
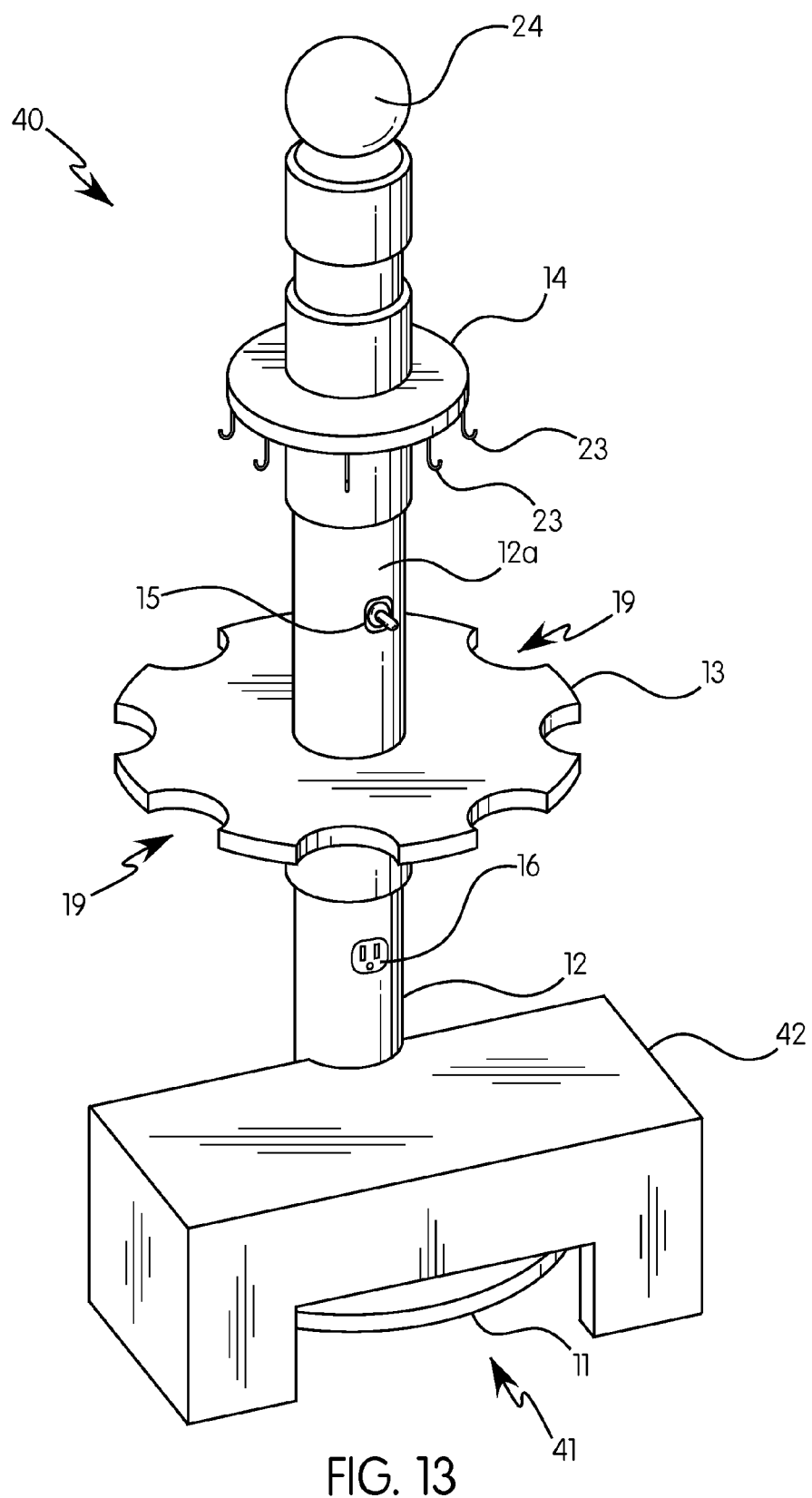
FIG. 13 is an isometric view of the embodiment of the barber clipper stand shown in FIG. 6, with a vacuum attachment.

In yet another embodiment as shown in FIG. 13, a vacuum accessory 42 can be attached near base 11 of pole 12. The vacuum accessory 42 is electrically connected to the power source for barber clipper stand 10. In use, cut hair can be swept toward the vacuum accessory 42, which can then be activated to vacuum the cut hair. The suction vent in the vacuum accessory can be a fixed vent 41 or attached to a hose (not shown). Vacuum accessory 42 can have a waste receptacle and access to same consistent with standard vacuum devices, and the configuration and placement of vacuum accessory 42 at the base 11 of pole 12 can vary.

Base 11 can be constructed of any rigid material and can have varying shapes. In FIGS. 1-5, base 11 has a circular perimeter shape. However, other geometric shapes can also be used, so long as base 11 provides stability and support to the barber clipper stand 10.

Similarly, central pole 12 is shown as having a circular cross section; however, other cross sectional shapes can be used. Pole 12 is also constructed of a rigid material. In a preferred embodiment, pole 12 is hollow, and the internal cavity of pole 12 is used to house power cords that run to various outlets 16 and 17, as well as light 24.

Figure 2:
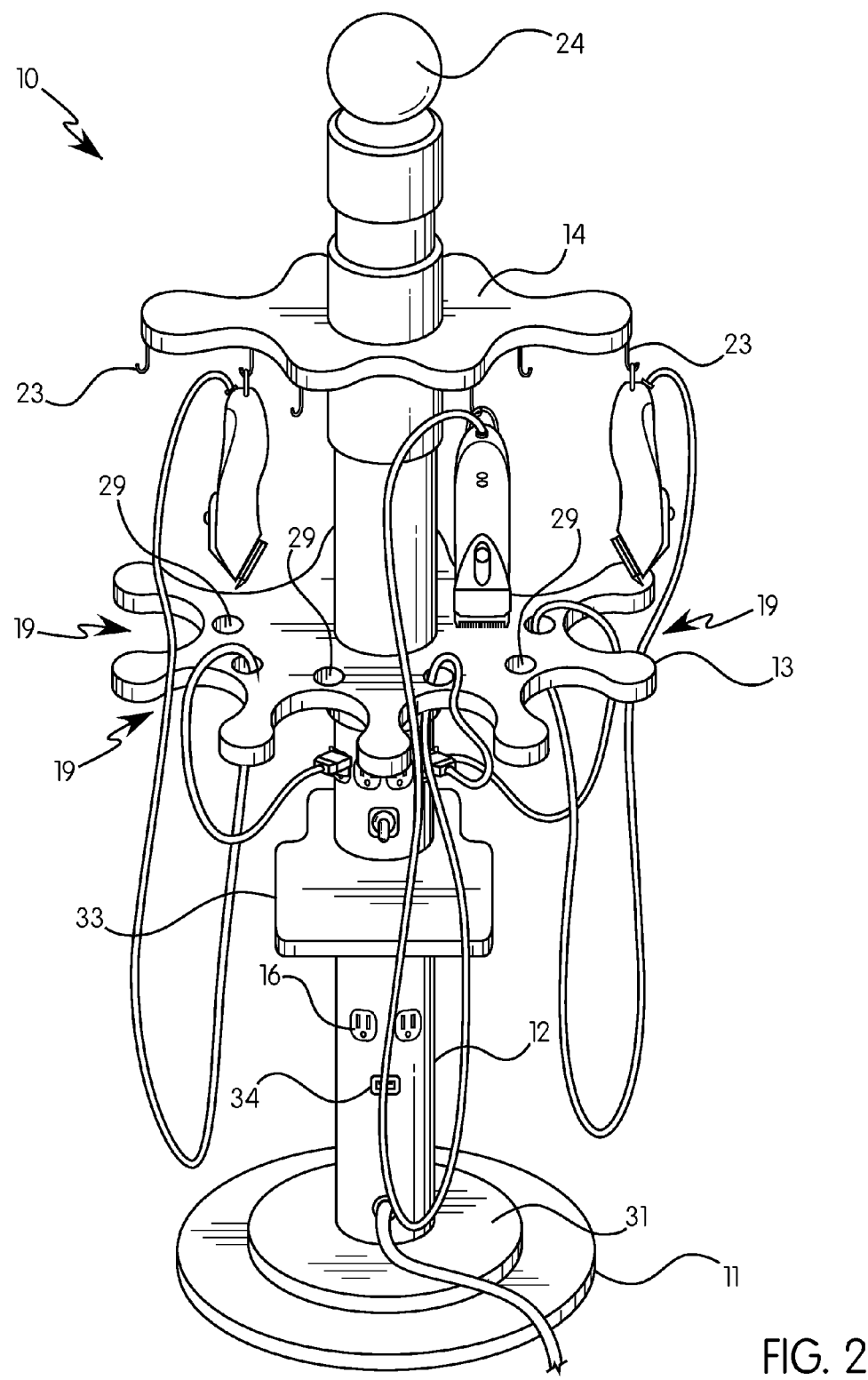
FIG. 2 is an isometric view of the embodiment of the present invention shown in FIG. 1, with barber clippers attached to the stand.

Cord separator 13 is located approximately in the middle of the vertical length of pole 12. In a preferred embodiment, Cord separator 13 has a flat plane or shelf which is substantially perpendicular to the vertical access of pole 12. Cord separator has a central opening 30, through which pole 12 passes. In other embodiments, cord separator 13 can be angled and have an uneven surface. In a preferred embodiment, cord separator 13 has an ovoid perimeter, but other geometric shapes, again, can be used. Cord separator 13 has at least two recessed areas 19 along the perimeter of cord separator 13, which, as shown in FIG. 2, are positioned and adapted to gather, hold and separate electrical cords 21 associated with each barber clipper 22. Recessed areas 19 can have various shapes, including semi-circles, wedges and rectangles. In one embodiment, recessed areas 19 have an internal radial width that is greater than the radial width of the external opening of recessed areas 19 along the perimeter of cord separator 13. In addition, each recessed area 19 has an associated aperture or cutout 29, which is located behind and internal to the recessed area 19 and is adapted to hold a single electrical cord that is plugged into an outlet 16. Apertures or cutouts 29 are preferably circular (although other shapes are possible) and have a diameter sufficient to allow for the passage of an electrical plug through apertures or cutouts 29. Cord separator 13 can also have at least one larger cutout 27 which can be used to hold a hair dryer or other appliances used by a barber or hair dresser Hanger holder 14 is located above cord separator 13. Hanger holder 14, in a preferred embodiment, also has a flat plane or shelf that is substantially perpendicular to the vertical access of pole 12. In alternative embodiments, however, hanger holder 14 can be angled and have an uneven surface. Hanger holder 14, in a preferred embodiment, has an ovoid perimeter, but other geometric shapes are possible. Hanger holder 14 has at least one hanger 23 located along the underside or outer perimeter of hanger holder 14. Hangers 23 are used to hold barber clippers 22, with hangers 23 being arranged to correspond to the location of recessed areas 19 below. In one embodiment of the present invention, there is a 1:1 ratio between the number of hangers 23 and the number of recessed areas 19.

Figure 3:
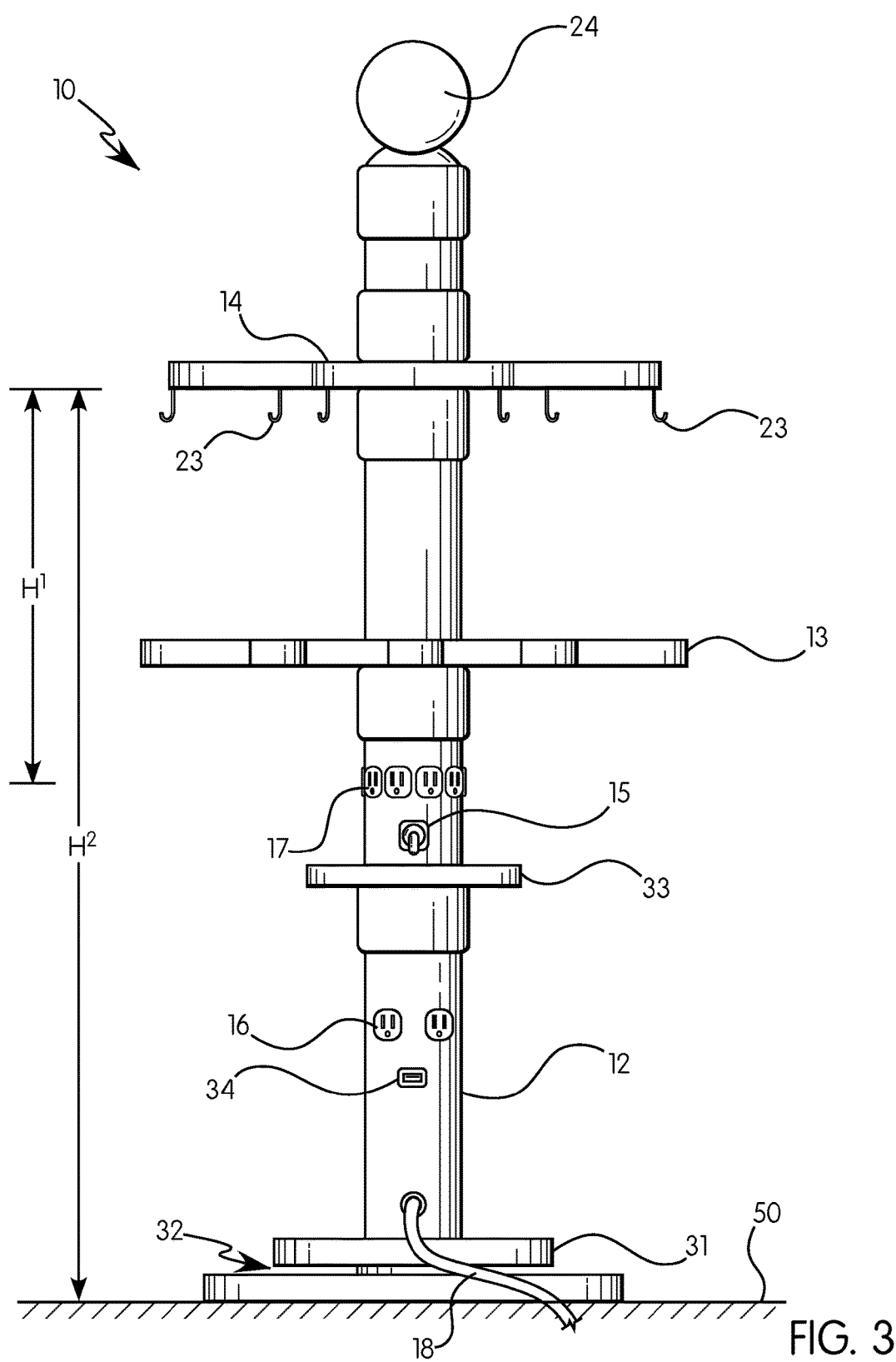
FIG. 3 is a front view of the embodiment of the barber clipper stand shown in FIG. 1.
Figure 4:
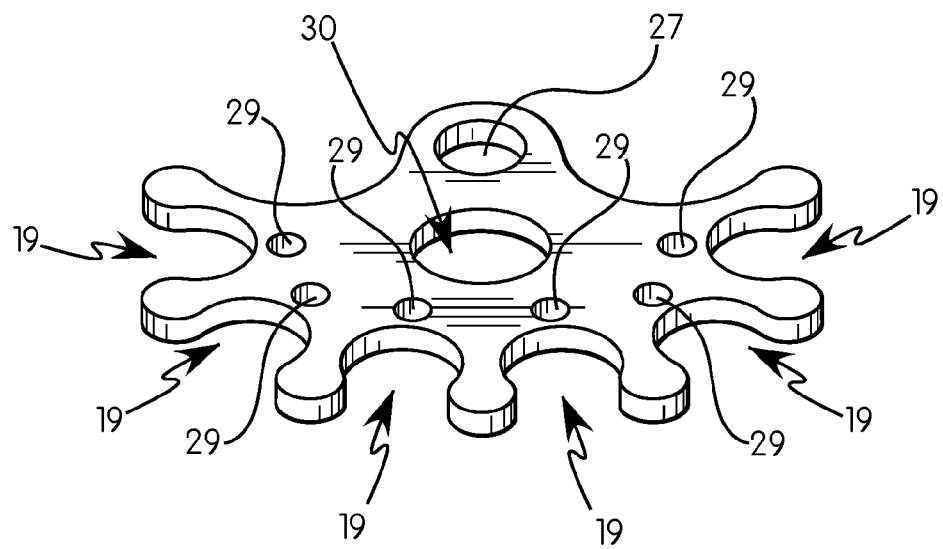
FIG. 4 is a isometric view of the cord separator of the barber clipper stand shown in FIG. 1.
Figure 5:
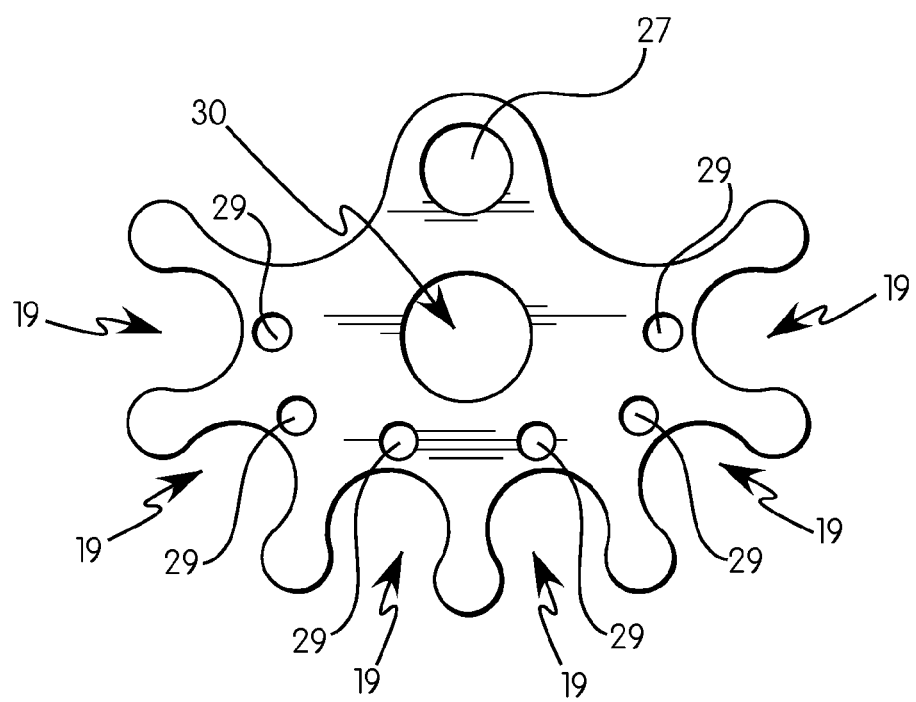
FIG. 5 is a top view of the cord separator of the embodiment of the barber clipper stand shown in FIG. 1.
Figure 6:
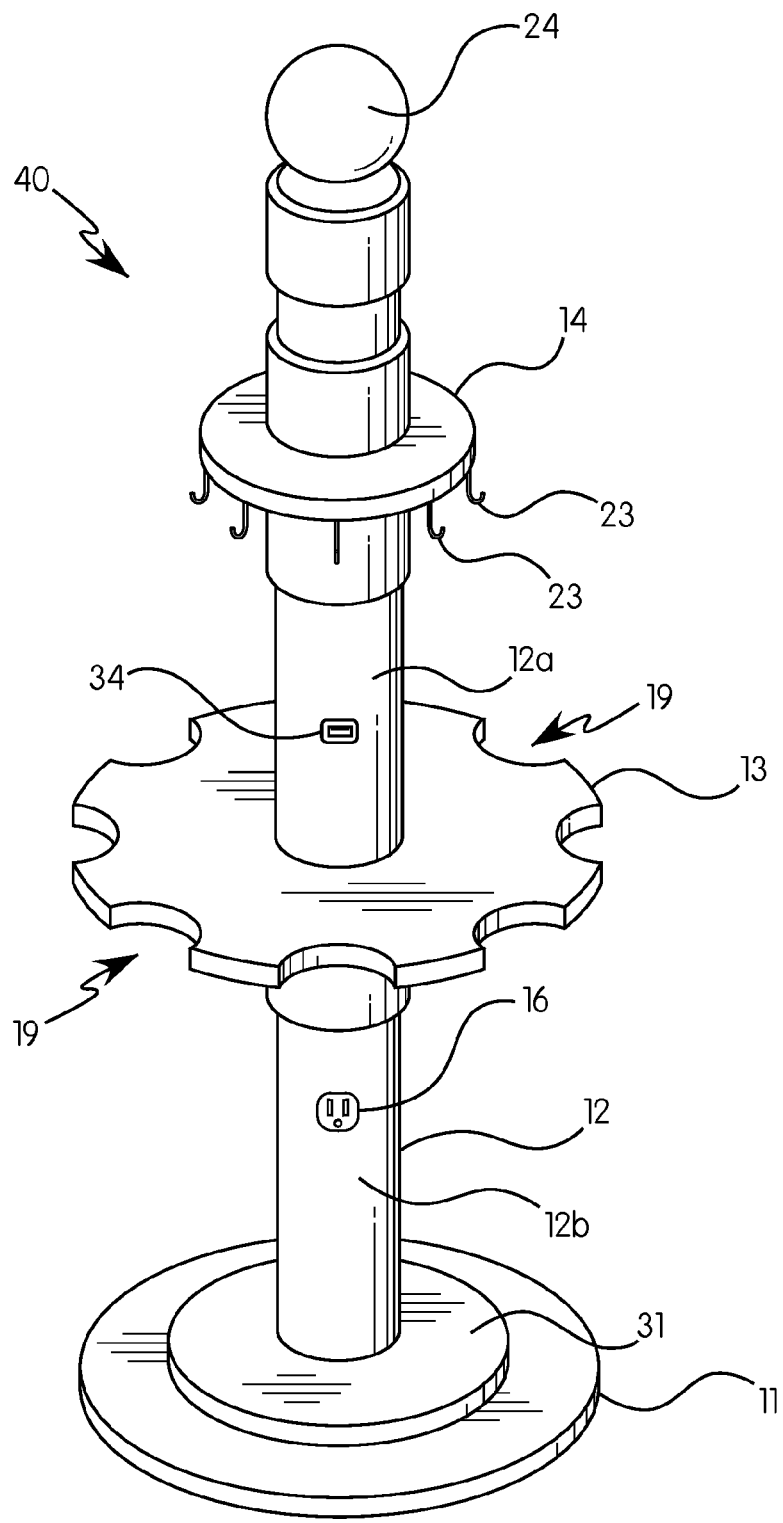
FIG. 6 is an isometric view of another embodiment of the barber clipper stand of the present invention.

As shown in FIG. 3, the distance H1 of hanger attachment holder 14 from the floor 50 at the bottom of base 11 and the distance H2 between hanger attachment holder 14 and outlets 17 are predetermined to suspend the full length of cords 21 and keep cords 21 off of the floor 50. Thus, for example, if a standard length of eight (8) feet is used for a barber clipper cord 21, and if H1 is three (3) feet, H2 would need to be at least (five) 5 feet in distance. The same measurements apply if stand 10 is hung on a wall (see FIG. 14).

An alternative barber clipper stand 40 is shown in FIGS. 6-9, and, similar to barber clipper stand 10 includes a base 11, a central pole 12, a cord separator 13, a hanger attachment holder 14, and at least one electrical outlet 17 located on pole 12 and under hanger attachment holder 14. This position of electrical outlets 17 differs from the position of outlets 17 in stand 10. Barber clipper stand 40 can also include, in alternative embodiments, at least one electrical outlet 16 located on pole 12 and under cord separator 13. Barber clipper stand 40, in turn, can be connected to an electrical outlet by electrical cord 18. Other power supplies may be used with barber clipper stand 40, such as a battery. In an alternative embodiment of the invention, a raised shelf 31 sits above base 11 to form recess 32. Recess 32 can be used to store cord 18 when not in use (cord 18 can be wrapped around pole 12 and inside recess 32. Shelf 31 can have varying perimeter shapes.

As with barber clipper stand 10, electrical cord 18 in barber clipper stand 40 provides power to all electrical outlets and devices associated with barber clipper stand 10, including electrical outlets 16 and 17, as well as light 24, which is mounted to the top of pole 12. Additional electrical outlets can also be added to pole 12 of barber clipper stand 40, such as outlets above hanger attachment holder 14. In an alternative embodiment, at least one USB port 34 can be added to pole 12 as well. This port is preferably located above cord separator 13 so that the barber or customer can charge a cellular or smart phone, or similar electronic device such as a tablet, while the device is resting on top of cord separator 13. Charging can occur while the barber is servicing the customer. Ports 34 can also be placed at other locations along pole 12. In a further embodiment, pole 12 can also include at least one electrical switch 15 that activates the power to all or a portion of the outlets, ports and lights associated with barber clipper stand 40. Preferably, this electrical or power switch 15 is located below cord separator 13, but one or more other locations are possible.

Figure 7:
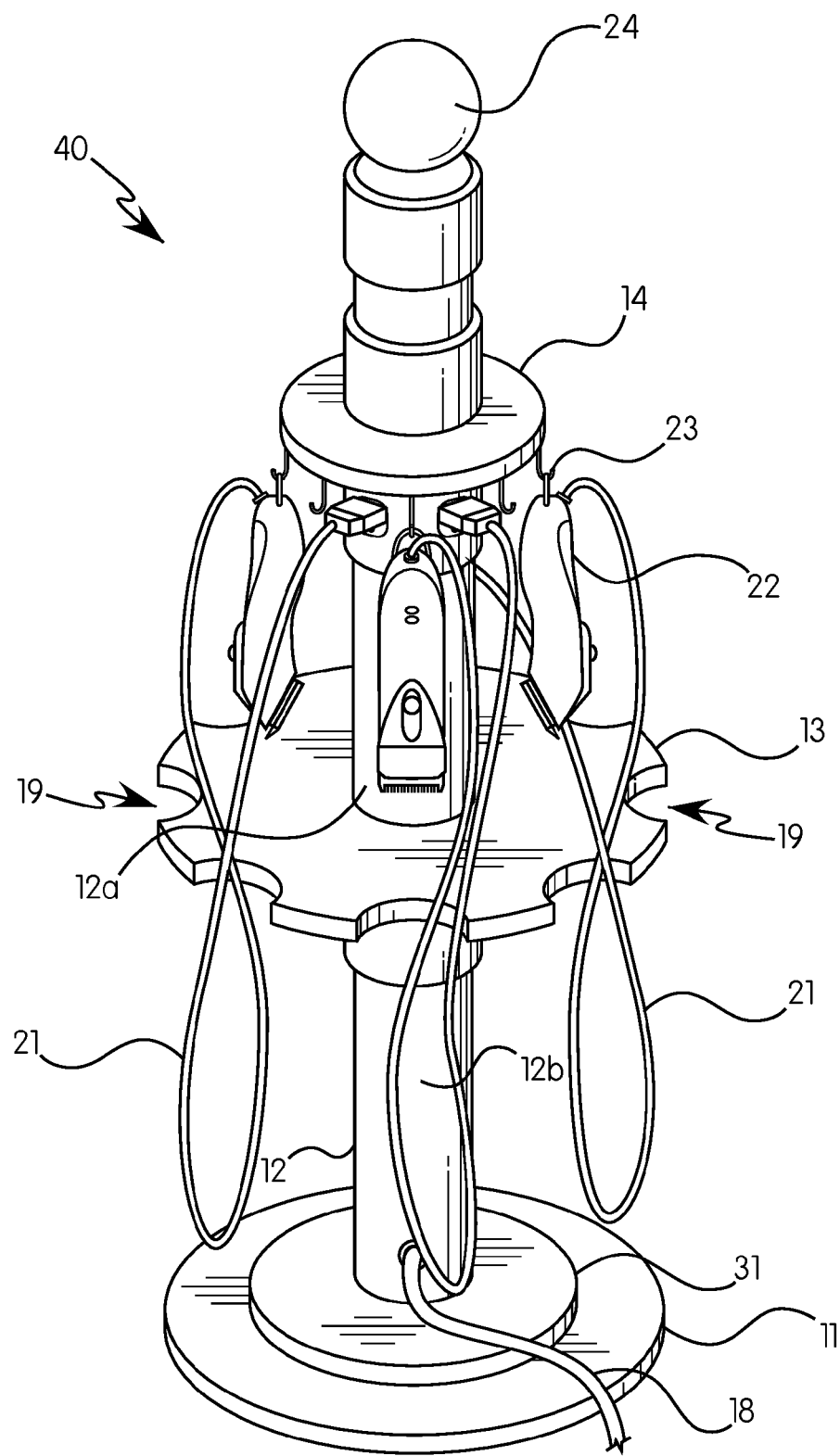
FIG. 7 is an isometric view of the embodiment of the present invention shown in FIG. 6, with barber clippers attached to the stand.

In an alternative embodiment of both barber clipper stands 10 or 40, as shown in FIG. 7, cord separator 13, with front A, has a modified number (5) of recessed areas 19, and other internal cut-outs as well. These cut-outs can include small circular cutouts 28 near pole 12 that can be used to pass a recharging or other electrical cord from the upper surface of cord separator 13 to the area below the cord separator 13. More directly, a cellular or smart phone or other device can be placed on cord separator 13 and a charging cord can be run from the phone or other device, through the circular cut-out, to an electrical outlet 16 in pole 12 located below cord separator 13. Larger cut-outs 27, which are preferably circular, can be made in cord separator 13 to act as receiving areas for other devices, such a blow dryer 25. In addition, cutouts 26 can be positioned near the perimeter of cord separator 13.

Figure 11:
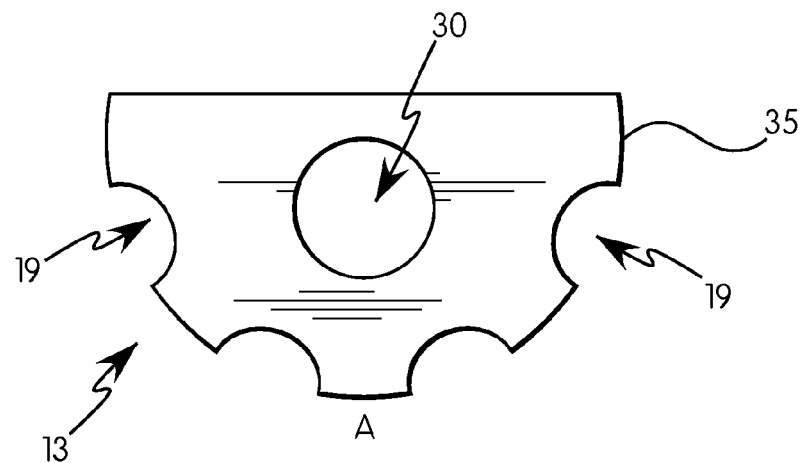
FIG. 11 is a top view of a further alternative embodiment of the cord separator in the embodiment of the barber clipper stand shown in FIG. 6, with a further modified shape and number of cut-outs.
Figure 12:
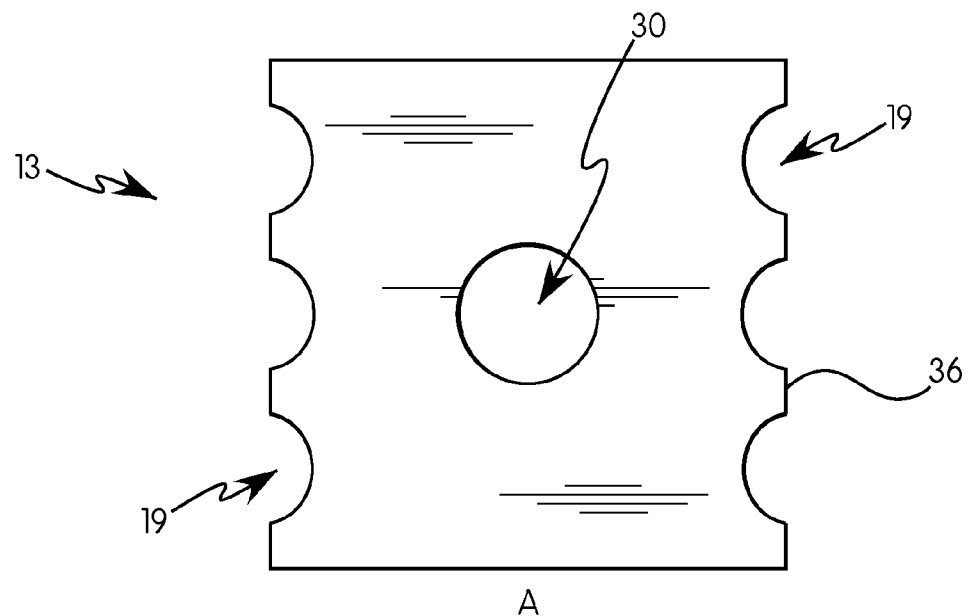
FIG. 12 is a top view of a further alternative embodiment of the cord separator in the embodiment of the barber clipper stand shown in FIG. 6, with a further modified shape and number of cut-outs.

FIGS. 11 and 12 show other embodiments of the cord separator 13. In particular, FIG. 11, with front A, shows cord separator 35 with a flat edge that would be disposed to the rear of pole 12. Cord separator 13 has a central opening 30 and recessed areas 19 arranged toward the front or operator side of pole 12 and stands 10 or 40. The number and position of recessed areas 19 in cord separator 35 can vary. In this embodiment, the hanger holder 14 would have a corresponding shape and orientation of hangers 23. This orientation of the recessed areas 19 in cord separator 35 assists in holding barber clippers 22 toward the front of barber clipper stands 10 or 40. FIG. 12, with front A, shows yet another embodiment of cord separator 36, again with a central opening 30 and recessed areas 19 situated on the sides of cord separator 35. This assists in allowing one barber clipper stand 10 or 40 to be used be two operators—each hanging their respective barber clippers on a respective side of stand 10 or 40. The hanger holder 14 and hangers 23 would have a corresponding orientation. Cord separators 13 shown in FIGS. 11 and 12 can also have internal cutouts 29 as otherwise shown in FIGS. 4 and 5.

Figure 14:
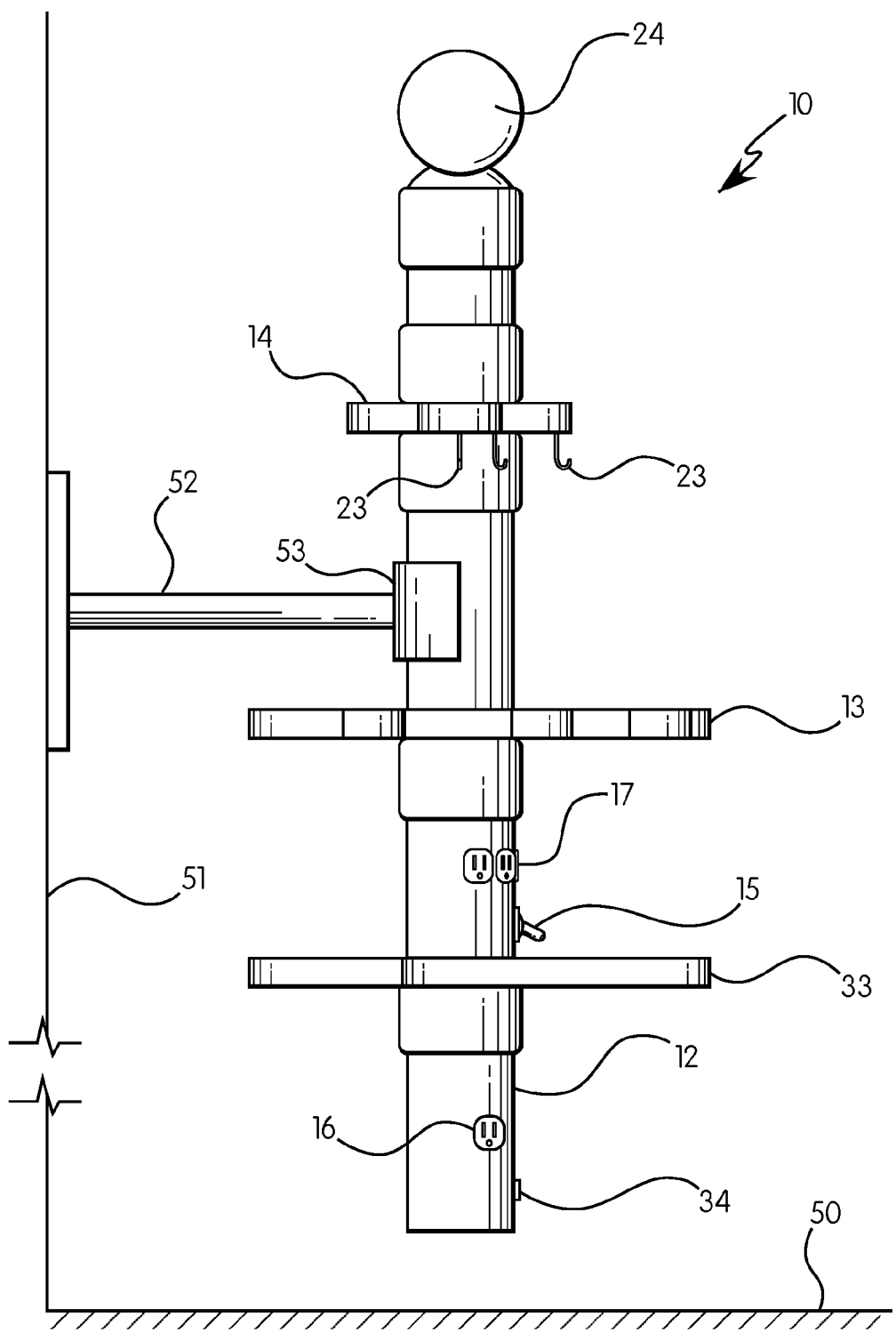
FIG. 14 is a side view of the embodiment of the barber clipper stand shown in FIG. 1, with a wall attachment.

In yet another embodiment, and as shown in FIG. 14, barber clipper stand 10 or 40 can be wall-mounted, such that stand 10 or 40 does not have a base 11. In FIG. 14, stand 10 is connected to wall 51 by wall-mounted bracket 52. Holder 53 is attached to end of bracket 52, and functions to clasp and hold stand 10 such that it is suspended above floor 50. This same mounting assembly can be used with clipper stand 40.

Barber clipper stand 40 of the present invention can also have another shelf or shelves that attach to and/or encompass pole 12. These shelves, similar to shelf 33 as shown with stand 10, can be placed at various locations along pole 12 and can be used to hold other items and accessories used for barber shop or hair dresser/cosmetology operations. These shelves and shelfs can have internal cut-outs, hangers and/or holder attachments along the perimeter to assist in holding various accessories and items. Also, hangers 23 can be attached to the underside of cord separator 13.

Figure 8:
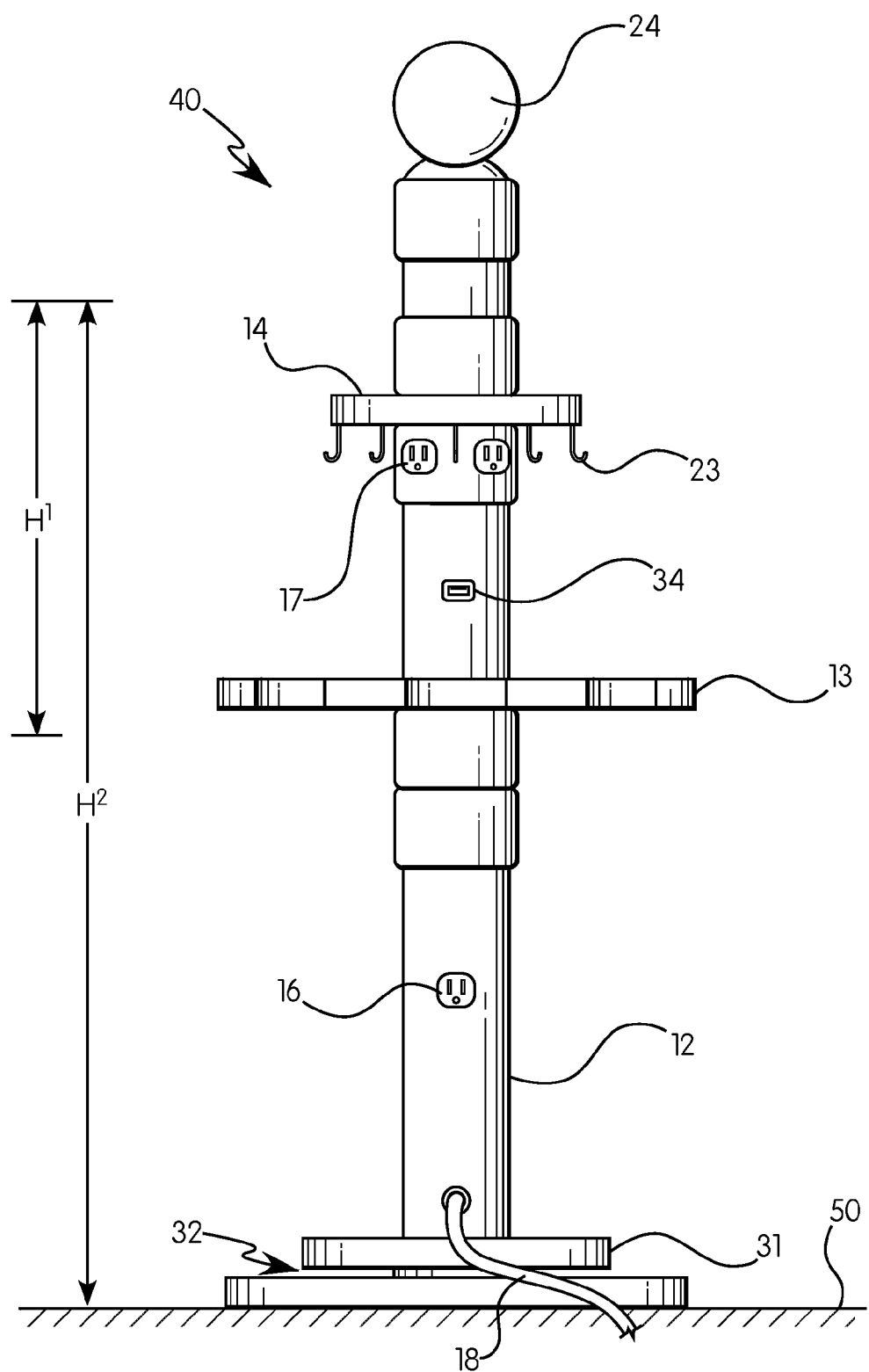
FIG. 8 is a front view of the embodiment of the barber clipper stand shown in FIG. 6.
Figure 9:
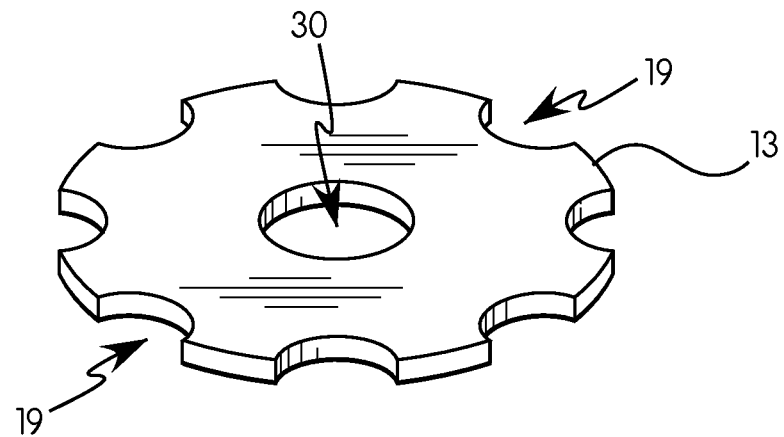
FIG. 9 is a isometric view of the cord separator of the barber clipper stand shown in FIG. 6.
Figure 10:
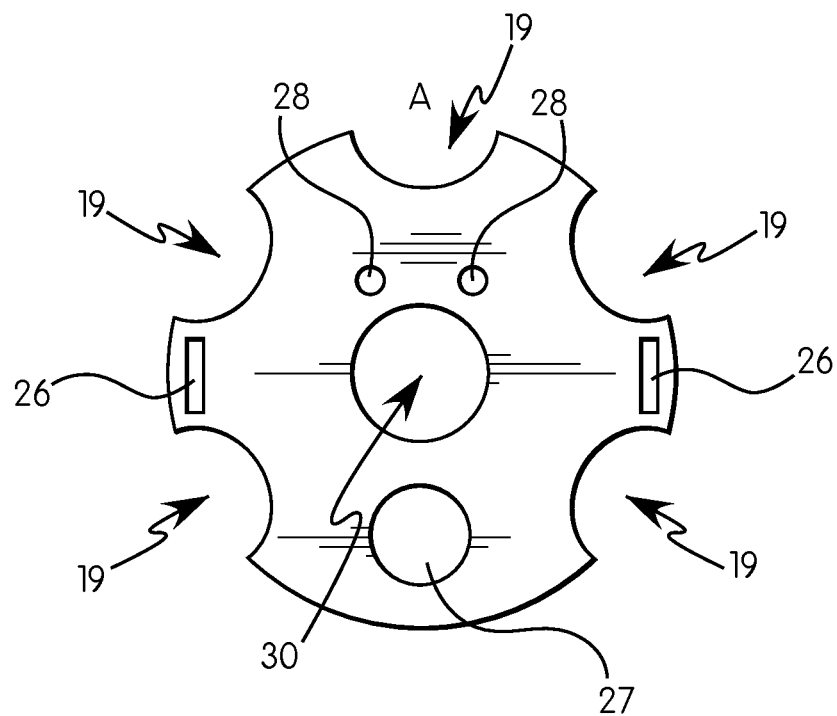
FIG. 10 is a top view of an alternative embodiment of the cord separator in the embodiment of the barber clipper stand shown in FIG. 6, with a modified number of cut-outs.

As shown in FIG. 8, the distance H3 of hanger attachment holder 14 and outlets 17 from the floor 50 at the bottom of base 11 is predetermined to suspend the full length of cords 21 and keep cords 21 off of the floor 50. Thus, for example, if standard (eight) 8 foot cords 21 are used, H3 would need to be at least four (4) feet in distance. The same measurement applies if stand 40 is hung on a wall, as shown in FIG. 14 with stand 10.

As discussed above in connection with both barber clipper stands 10 and 40, an alternative light 24 can be located at the top of pole 12. Light 24 can have any shape or size and can, for example, can be a globe light similar to the light at the top of a barber light. A lighted barber pole can also be incorporated into barber clipper stands 10 or 40. Light 24 can be activated when cord 18 is plugged in and/or by a separate switch associated with pole 12.

In a further embodiment of barber clipper stands 10 or 40, the invention can be disassembled for travel and setup in various locations. More specifically, by way of one example, the lower section 12b of pole 12 can separate from the upper section 12a of pole 12. In addition, a carry handle can be attached to either or both of pole sections 12a and 12b. In connection with such disassembly, the power supply from cord 18 also is separated between sections 12a and 12b. This can be done internally or externally to pole 12.

In view of the above, it will be seen that the several objections of the invention are achieved and other advantageous results obtained. As various changes could be made in the above device without departing from the scope of the invention, it is intended that all matter contained in the above description or shown in the accompanying drawings shall be interpretive as illustrative and not in a limiting sense.

What is claimed is:

1. An apparatus for holding and separating the electrical power cords of multiple barber clippers and other barber accessories, the apparatus comprising:
   a hollow central pole with a top and bottom and including a power supply located inside the central pole and at least one electrical outlet located on the central pole;
   at least one hanger attachment holder attached to the central pole, the at least one hanger attachment holder comprised of a substantially flat hanger shelf and at least two hangers attached to the underside or perimeter of the hanger shelf for holding barber clippers and other barber accessories; and
   at least one cord separator attached to the central pole and located under the at least one hanger attachment holder, the at least one cord separator comprised of a substantially flat separator shelf having a perimeter and at least two recessed areas located at the perimeter of the shelf each recessed area having an external opening with a width aligned to the shelf perimeter and a corresponding separate aperture located internal to the recessed area; and each recessed area and corresponding aperture aligned with a corresponding hanger on the hanger shelf and configured to gather, hold, and separate the electrical power cord of a single barber clipper or other barber accessory held by the hanger.

2. The apparatus of claim 1, wherein the apparatus further comprises a base attached to the bottom of the central pole.

3. The apparatus of claim 1, wherein the apparatus further comprises at least one USB port located on the central pole.

4. The apparatus of claim 1, wherein the apparatus further comprises a vacuum accessory attached to the central pole.

5. The apparatus of claim 1, wherein the apparatus further comprises a light attached to the top of the central pole.

6. The apparatus of claim 1, wherein the apparatus is portable.

7. The apparatus of claim 6, where the central pole is sectional and can be disassembled and assembled.

8. The apparatus of claim 1, wherein the apparatus further comprises at least one shelf attached to the central pole.

9. The apparatus of claim 1, wherein the at least one separator shelf has internal cutouts to aid in holding barber accessories by insertion into the internal cutouts.

10. The apparatus of claim 1, wherein the apparatus is wall-mounted.

11. An apparatus for holding and separating the electrical power cords of multiple barber clippers and other barber accessories, the apparatus comprising:
    a hollow central pole with a top and bottom and including a power supply located inside the central pole and at least one electrical outlet on the central pole;
    at least one hanger attachment holder attached to the central pole, the at least one hanger attachment holder comprised of a substantially flat hanger shelf and at least two hangers attached to the underside or perimeter of the hanger shelf for holding barber clippers and other barber accessories; and
    at least one cord separator attached to the central pole and located under the at least one hanger attachment holder, the at least one cord separator comprised of a substantially flat separator shelf having a perimeter and at least two recessed areas located at the perimeter of the shelf each recessed area having an external opening with a width aligned to the shelf perimeter and an internal width parallel to the shelf perimeter that is greater that the width of the external opening; and each recessed area aligned with a corresponding hanger on the hanger shelf and configured to gather, hold, and separate the electrical power cord of a barber clipper or other barber accessory held by the hanger.

12. The apparatus of claim 11, wherein the apparatus further comprises a base attached to the bottom of the central pole.

13. The apparatus of claim 11, wherein the apparatus further comprises at least one USB port located on the central pole.

14. The apparatus of claim 11, wherein the apparatus further comprises a vacuum accessory attached to the central pole.

15. The apparatus of claim 11, wherein the apparatus further comprises a light attached to the top of the central pole.

16. The apparatus of claim 11, wherein the apparatus is portable.

17. The apparatus of claim 16, where the central pole is sectional and can be disassembled and assembled.

18. The apparatus of claim 11, wherein the at least one separator shelf has internal cutouts to aid in holding barber accessories by insertion into the internal cutouts.

19. The apparatus of claim 11, wherein the apparatus is wall-mounted.

\* \* \* \* \*